(12) United States Patent
Fujioka et al.

(10) Patent No.: US 6,949,041 B2
(45) Date of Patent: Sep. 27, 2005

(54) VEHICLE DRIVING SYSTEM

(75) Inventors: Masato Fujioka, Saitama (JP); Junya Tachikawa, Saitama (JP); Tatsuya Fukushima, Saitama (JP)

(73) Assignee: Honda Giken Kogyo Kabushiki Kaisha, Tokyo (JP)

( * ) Notice: Subject to any disclaimer, the term of this patent is extended or adjusted under 35 U.S.C. 154(b) by 0 days.

(21) Appl. No.: 10/677,489

(22) Filed: Oct. 3, 2003

(65) Prior Publication Data

US 2004/0116227 A1 Jun. 17, 2004

(30) Foreign Application Priority Data

Oct. 3, 2002 (JP) ..................... P2002-291330

(51) Int. Cl.⁷ .......................... F16H 3/72; F16H 37/06; B60K 25/00; B60K 1/00
(52) U.S. Cl. .............. 475/5; 475/8; 180/53.5; 180/53.8; 180/65.1
(58) Field of Search .................. 475/5, 8; 62/323.1, 62/323.3, 323.4; 180/53.5, 53.8, 65.1, 65.2

(56) References Cited

U.S. PATENT DOCUMENTS

| | | | |
|---|---|---|---|
| 5,558,173 A | * | 9/1996 | Sherman ................. 180/53.8 |
| 6,048,288 A | * | 4/2000 | Tsujii et al. ................. 477/5 |
| 6,234,769 B1 | * | 5/2001 | Sakai et al. ................ 417/374 |
| 6,425,838 B1 | * | 7/2002 | Matsubara et al. .......... 475/5 |
| 6,672,415 B1 | * | 1/2004 | Tabata ...................... 180/65.2 |
| 6,735,962 B2 | * | 5/2004 | Iwanami et al. ............. 62/133 |
| 6,801,842 B2 | * | 10/2004 | Egami et al. ............... 701/36 |
| 2003/0094317 A1 | * | 5/2003 | Takizawa et al. .......... 180/53.8 |
| 2003/0224903 A1 | * | 12/2003 | Kitamura et al. ............. 477/5 |
| 2004/0079098 A1 | * | 4/2004 | Uno et al. .................... 62/236 |
| 2004/0173174 A1 | * | 9/2004 | Sugino et al. ........... 123/179.28 |
| 2004/0202550 A1 | * | 10/2004 | Kawaguchi et al. ........ 417/212 |

FOREIGN PATENT DOCUMENTS

| | | |
|---|---|---|
| DE | 38 12412 A1 | 10/1989 |
| DE | 44 32 679 A1 | 3/1996 |
| DE | 197 38 250 A1 | 3/1999 |
| EP | 1 314 884 A2 | 5/2003 |
| JP | 53-14402 | 5/1978 |
| JP | 2758642 | 3/1998 |
| JP | 2000-120463 | 4/2000 |
| JP | 3180506 | 4/2001 |

* cited by examiner

*Primary Examiner*—Tisha Lewis
(74) *Attorney, Agent, or Firm*—Westerman, Hattori, Daniels & Adrian, LLP

(57) ABSTRACT

A vehicle driving system includes a pulley shaft synchronously rotating with a crankshaft of an engine, an auxiliary unit drive shaft driving an auxiliary unit, a planetary gear mechanism portion having elements such as a sun gear, a pinion carrier and a ring gear. The pulley shaft and the auxiliary unit drive shaft are adapted for connection to any two of the elements, respectively. The motor connecting to the remaining element of the planetary gear mechanism portion. A lock-up clutch connecting together the two or more elements of the planetary gear mechanism portion. A one-way clutch for restricting the rotation of the auxiliary unit drive shaft in one direction, wherein the planetary gear mechanism portion, the motor, the lock-up clutch, and the auxiliary unit drive shaft are coaxially disposed in line.

6 Claims, 12 Drawing Sheets

FIG. 14

| | LOCK-UP CLUTCH (21) | OWC (22) | OWC (22') | AUXILIARY UNIT CLUTCH (23) | MOTOR (12) | |
|---|---|---|---|---|---|---|
| ENGINE STOPPED, AIR CONDITIONER OFF | OFF | — | — | — | STOPPED | STOPPED |
| ENGINE STOPPED, AIR CONDITIONER ON | OFF | FREE | LOCKED UP | ON | REVERSE ROTATION | MOTOR DRIVE |
| ENGINE STARTED UP | OFF | LOCKED UP | FREE | — | FORWARD ROTATION | MOTOR DRIVE |
| ENGINE IN OPERATION, AIR CONDITIONER ON | ON | FREE | FREE | ON | FORWARD ROTATION | POWER GENERATION OR MOTOR DRIVE |
| ENGINE IN OPERATION, AIR CONDITIONER OFF | ON | FREE | FREE | OFF | FORWARD ROTATION | POWER GENERATION OR MOTOR DRIVE |

VEHICLE DRIVING SYSTEM

BACKGROUND OF THE INVENTION

1. Filed of the Invention

The present invention relates to a driving system for vehicles which employ an internal combustion engine as a source of driving force, and more particularly to a driving system for vehicles which are designed such that the engine automatically stop idling while they are brought to a stop or hybrid vehicles in which another power source is used to run them with the internal combustion engine being brought to a stop.

2. Description of the Related Art

Vehicles attracting people's attention in recent years are hybrid vehicles and automatic engine idling stop vehicles. The hybrid vehicles are run by a motor using regenerative power and power generated while an engine is driven with the engine being brought to a halt in low-load driving conditions or while the vehicles stops. The automatic engine idling stop vehicles are designed such that the engine automatically stops idling when the vehicles stop.

Some of these hybrid and automatic engine idling stop vehicles are equipped with an auxiliary motor, for example, which is exclusively used for driving an auxiliary unit such as an air conditioner compressor even when the engine stops (for example, refer to Patent Literature No. 1).

In addition, in other hybrid and automatic engine idling stop vehicles, a motor designed to function as a starter is linked to the engine and the auxiliary unit with a clutch provided on the crankshaft, whereby a torque transmission between the motor and the engine is cut off. The auxiliary unit can be driven by the motor (Referring to JP 2000-120463, for example). Here, some of the motors are provided with a planetary gear mechanism and a one-way clutch which are combined to switch reduced speed ratios so as to deal with the rotational speed characteristics relative to the crankshaft of the motor as the starter and the rotational speed characteristics of the motor as a generator. (Referring to Japanese Patents letters No. 3180506 and No. 2758642 for example).

[Patent Literature No. 1]
  Japanese Patent No. 3180506
[Patent Literature No. 2]
  JP-A-2000-120463
[Patent Literature No. 3]
  Japanese Patent No. 2758642
[Patent Literature No. 4]
  JP-B-35-14402

However, mounting the auxiliary motor only for driving the auxiliary unit such as the air conditioner compressor causes a problem that the number of components is increased, to thereby increase the production costs. In addition, in the case where the motor functioning as the starter is used to drive the auxiliary unit, providing the clutch on the crankshaft of the engine results in an increase in the longitudinal dimension of the engine along the crankshaft. This causes a big problem in a case where a space for installing the engine is limited.

Furthermore, in a case where the driving system including the motor and the planetary gear mechanism is disposed substantially in parallel with the crankshaft, there is a problem that the engine installation space is largely limited due to the layout of intake and exhaust manifolds of the engine.

SUMMARY OF THE INVENTION

It is an object of the invention to provide a vehicle driving system which can drive the auxiliary unit while the engine is stopped, start up the engine and charge the battery with a single motor, to thereby have a simple and easy construction and good mounting properties.

As a means for solving the problems, according to a first aspect of the invention, there is provided with a vehicle driving system including:

a synchronizing shaft synchronously rotating with a crankshaft of an engine;

a drive shaft driving an auxiliary unit;

a planetary gear mechanism having elements such as a sun gear, a pinion carrier and a ring gear, said synchronizing shaft and said drive shaft connecting to any two of said elements of said planetary gear mechanism, respectively;

a motor connecting to a remaining element of said planetary gear mechanism;

connecting device for connecting together said two or more elements of said planetary gear mechanism; and a rotation restricting mechanism for restricting the rotation of the drive shaft in one direction, wherein said planetary gear mechanism, said motor, said connecting device and said drive shaft are coaxially disposed in line.

According to a second aspect of the invention, there is provided with the vehicle driving system according to any of claims 1 and 2, wherein said connecting means, said motor, said planetary gear mechanism and said drive shaft are disposed in that order.

According to the construction provided by the first and second aspects of the invention, by releasing the two or more elements of the planetary gear mechanism from the connected state by the connecting means and causing the motor to operate in a direction in which the rotational direction of the drive shaft is restricted by the rotation restricting means, the torque of the motor is changed in magnitude through the elements of the planetary gear mechanism and is then transmitted to the synchronizing shaft so as to start up the engine.

In addition, by releasing the elements of the planetary gear mechanism from the connected state by the connecting means and causing the motor to operate in a direction in which the rotational direction of the motor is permitted by the rotational direction restricting means, the motor torque is change in magnitude through the elements of the planetary gear mechanism and is then transmitted to the auxiliary unit drive shaft so as to drive the auxiliary unit.

Furthermore, by bringing the connecting means into an engaged condition to thereby connect together the two or more elements of the planetary gear mechanism, all the three elements are integrated together so that the synchronizing shaft and the drive shaft are brought into a directly connected condition, whereby the auxiliary unit can be driven by virtue of the engine torque.

Then, the planetary gear mechanism, the motor, the connecting means and the auxiliary unit drive shaft can be coupled together on the same axis, and the auxiliary unit can be connected on the same axis.

According to a third aspect of the invention, there is provided with the vehicle driving system according to claim 1, wherein said planetary gear mechanism is a single pinion planetary gear mechanism in which said synchronizing shaft, said pinion carrier and said drive shaft are connected to the pinion carrier, the sun gear and the ring gear, respectively, wherein said connecting device and said planetary gear mechanism are disposed adjacent to said motor, respectively, such that said motor is hold between said connecting device and said planetary gear mechanism, wherein said connecting device is disposed one side of said motor, and said planetary gear mechanism is disposed on the other side of said motor with the drive shaft being disposed adjacent to said planetary gear mechanism at a location thereof which is opposite to a location where the motor is disposed.

According to the construction, when transmitting the motor torque to the synchronizing shaft of the engine or to the drive shaft, the motor torque can be amplified through the elements of the planetary gear mechanism. In addition, when connecting the auxiliary unit to the drive shaft in line, there is no need to make the shaft of the auxiliary unit hollow.

According to a fourth aspect of the invention, there is provided with the vehicle driving system according to any of claims 1 to 3, wherein a pulley is provided on said synchronizing shaft, and said connecting device is disposed in the interior of the pulley.

According to the construction, there can be provided a nest construction in which the connecting means is disposed in the interior of the pulley.

According to a fifth aspect of the invention, there is provided with the vehicle driving system according to any of claims 1 to 4, wherein the rotation restricting means is disposed adjacent to the planetary gear mechanism.

According to the construction, there is provided a vehicle driving system as set forth in any of the first to fifth aspects of the invention, wherein the drive shaft and the auxiliary unit are disposed on different axes.

According to the construction, the driving system and the auxiliary unit can be laid out according to a space in the vehicle, which is available for installing them.

According to the sixth aspect of the invention, there is provided with the vehicle driving system according to any of claims 1 to 5, wherein said drive shaft and said auxiliary unit are disposed on different axes, since the driving system and the auxiliary unit can be laid out according to the available installation space of the vehicle, the degree of freedom in installing the driving system in the vehicle can be enhanced.

BRIEF DESCRIPTION OF THE DRAWINGS

FIG. 14 is showing a chart explaining conditions of a vehicle equipped with the driving system.

DESCRIPTION OF THE PREFERRED EMBODIMENTS

An embodiment of the invention will be described below by reference to the accompanying drawings.

Figure 1:
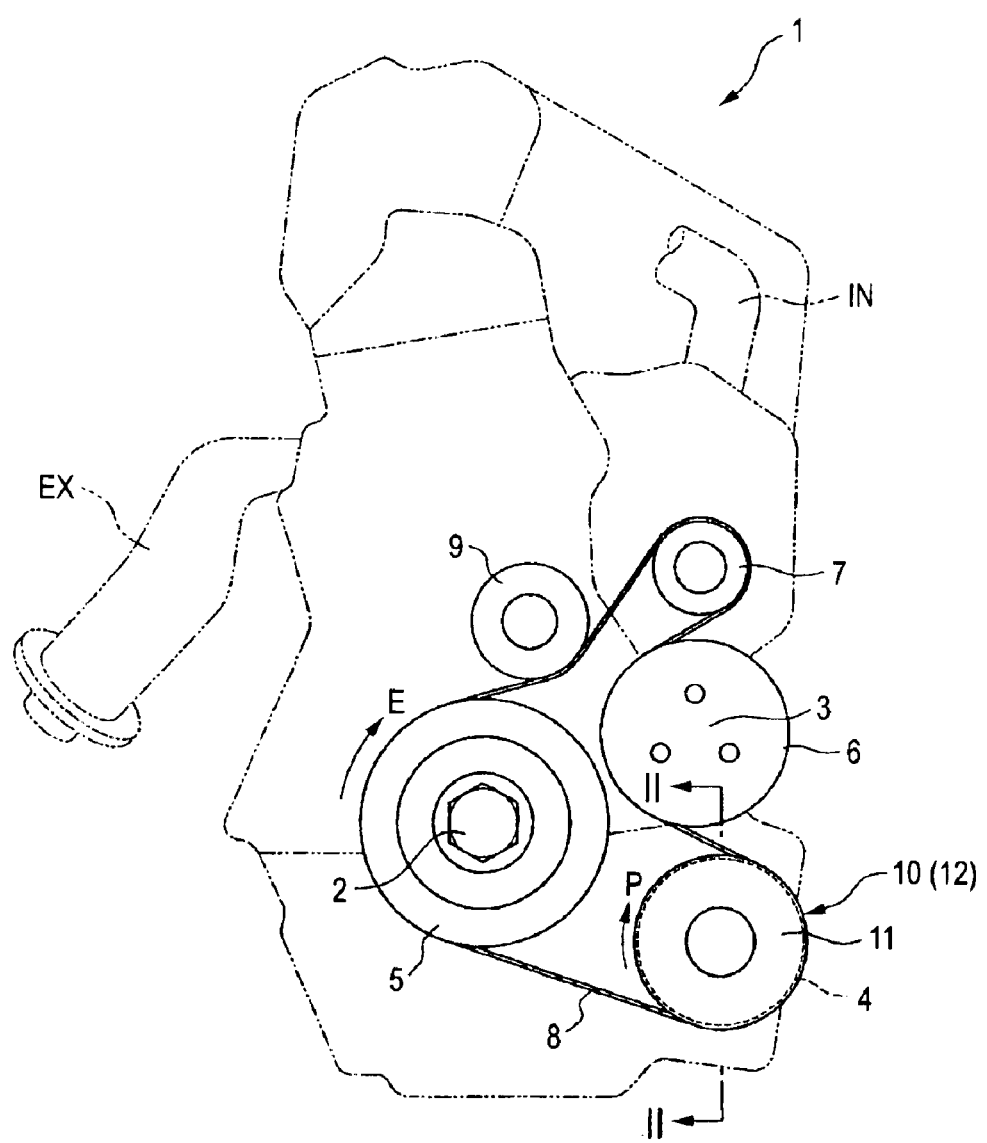
FIG. 1 is showing a front view of an engine according to an embodiment of the invention.

As shown in FIG. 1, an internal combustion engine 1 according to an embodiment of the invention has a water pump 3 and a driving system 10 which is coaxially connected to an air conditioner compressor 4 on a side of the engine which extends along a longitudinal direction of a crankshaft thereof. The water pump 3, the compressor 4 and the driving system 10 are disposed substantially in parallel with the crankshaft 2 (or are side mounted) so as to avoid the interference with an inlet manifold IN.

A crankshaft pulley 5 is provided at an end of the crankshaft 2. A belt 8 is wound around the crankshaft pulley 5, a water pump pulley 6 provided on the water pump 3, a pulley 11 provided at one end of the driving system and an idler pulley 7 so as to be able to link them to one another. The driving system 10 is provided with a motor 12, which will be described later. The motor 12 functions as a starter for the engine 1 and a generator. The motor 12 is also designed to drive the compressor 4, which is an auxiliary unit, when the engine 1 is brought to a stop. Here, the rotational direction of the crankshaft pulley 5 is indicated by an arrow E, and the rotational direction of the pulley 11 of the driving system 10 is indicated by an arrow P. A reference numeral 9 denotes a tension pulley of the belt 8. the reference character EX denotes an exhaust manifold.

Figure 2:
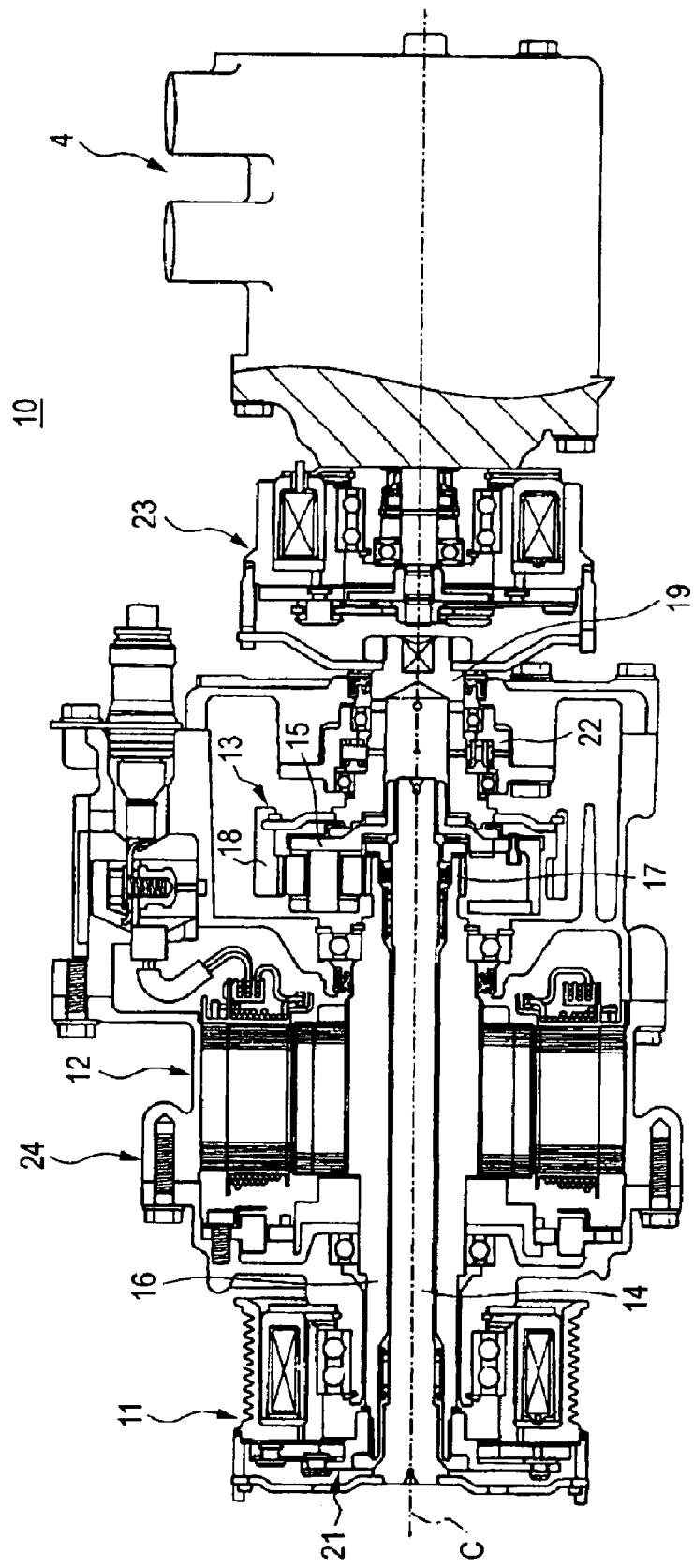
FIG. 2 is showing a longitudinal cross-sectional view taken along the line A—A in FIG. 1.

As shown in FIG. 2, the pulley 11, which synchronously rotates with the crankshaft 2, is disposed at the front of the driving system 10 (or on a left-hand side of the driving system 10 in the figure). The motor 12, which drives coaxially with the pulley 11, is disposed behind the pulley 11 (or on a right-hand side of the pulley 11 in the figure). Furthermore, a planetary gear mechanism portion (a planetary gear mechanism) 13 is disposed behind the motor 12 coaxially therewith. The pulley 11 connects to a pinion carrier 15 of the planetary gear mechanism portion 13 via the pulley shaft (synchronizing shaft) 14. The motor 12 connects to a sun gear 17 of the planetary gear mechanism portion 13 via a rotor shaft 16. Then, by allowing a differential motion to take place in the planetary gear mechanism portion 13, the pulley 11 and the motor 12 are linked to each other at a predetermined reduced gear ratio. Further, an auxiliary unit drive shaft (a drive shaft) 19 connecting to a ring gear 18 from the rear of the planetary gear mechanism portion 13 can be driven. Here, the rotor shaft 16 is formed as a hollow shaft. The pulley shaft 14 rotatably passes therethrough.

A lock-up clutch (a connecting means) 21 for connecting the pulley shaft 14 with the rotor shaft 16 is placed in an inner circumferential portion of the pulley 11. The planetary gear mechanism portion 13 operates together with the lock-up clutch as an integrated unit, whereby the pulley shaft 14 and the rotor shaft 16 can be directly connected to the auxiliary unit drive shaft 19. Therefore all the shafts can be driven together. A one-way clutch (a rotational direction restricting means) 22 for restricting the rotation of the pulley 11 only in a clockwise direction (a direction indicated by the arrow P) is disposed on an outer circumferential portion of the auxiliary unit drive shaft 19. In addition, an auxiliary unit clutch 23 is provided at a rear end portion of the auxiliary unit drive shaft 19 for engagement with and disengagement from the compressor 4 which effects and cuts off the transmission of torque to the compressor 4. Here, the motor 12, the planetary gear mechanism portion 13, the auxiliary unit drive shaft 19 and the one-way clutch 22 are accommodated in a main body casing 24. Then, the driving system 10 is configured that the pulley 11, the motor 12, the planetary gear mechanism portion 13, the auxiliary unit drive shaft 19, the lock-up clutch 21, the one-way clutch 22 and the auxiliary unit clutch 23 are disposed in line to share an axis C.

Figure 3:
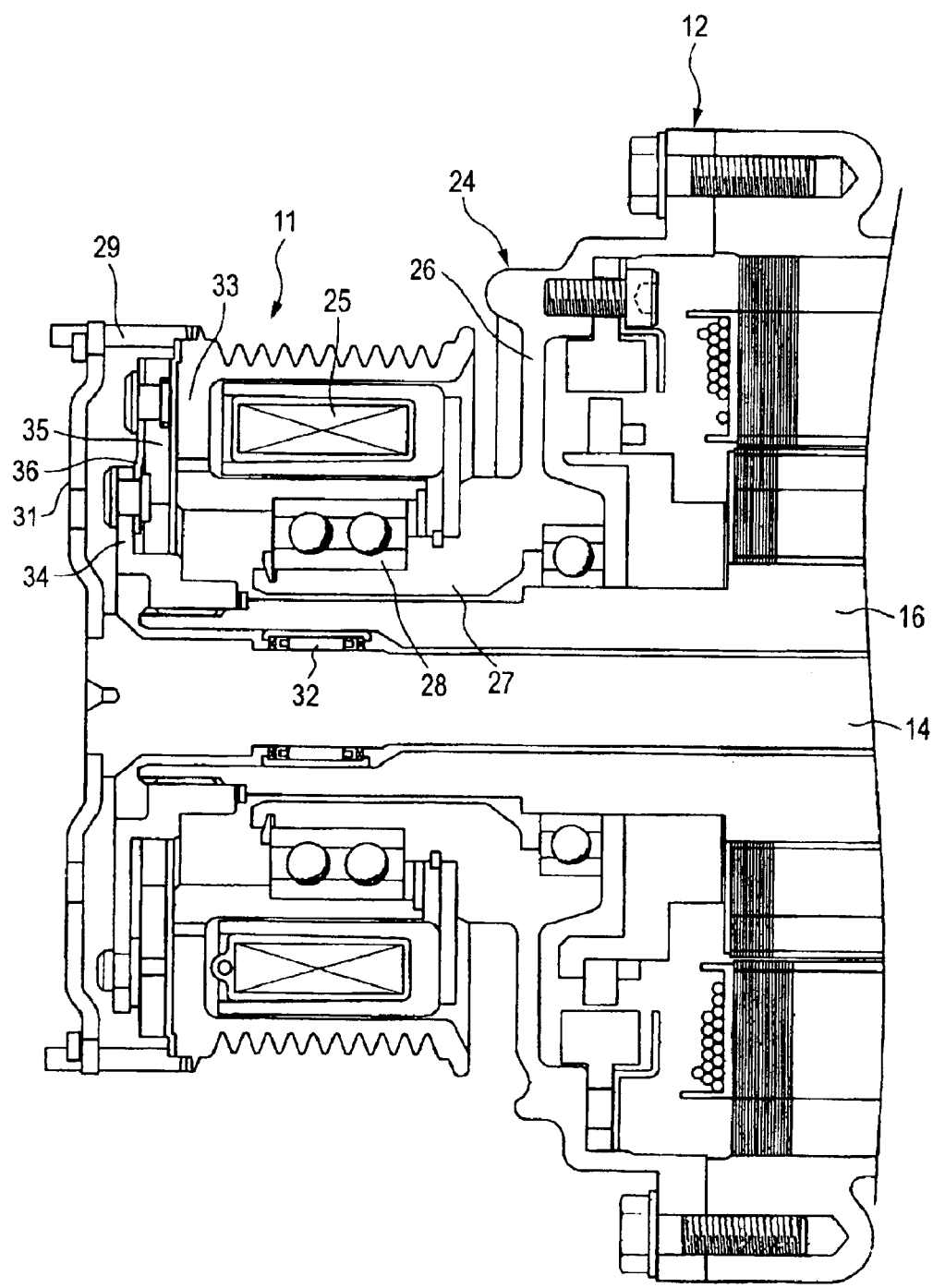
FIG. 3 is showing a detailed cross-sectional view of a pulley and a lock-up clutch.

As shown in FIG. 3, a round tubular portion 27 through which the rotor shaft 16 is allowed to pass is formed on a front wall 26 of the main body casing 24 behind the pulley 11 so that the round tubular portion 27 protrudes forward from the front wall 26. The pulley 11 is rotatably supported on the main body casing 24 by ball bearings 28 which are provided in a plurality of rows on an outer circumferential portion of the round tubular portion 27. A pulley plate 31 is attached to a front side of the pulley 11 via an extension 29. A front end of the pulley shaft 14 is connected to a central portion of the pulley plate 31 so attached. Needle bearings 32, which abuts with an inner circumferential portion of the rotor shaft 16, are installed on an outer circumferential portion of the pulley shaft 14, whereby the pulley shaft 14 is rotatably supported on the rotor shaft 16. A flattened rotor disc 34 is disposed between the pulley plate 31 and a front wall portion 33 of the pulley 11. The rotor disc 34 is connected to a front end portion of the rotor shaft 16 extending as far as a vicinity of the pulley plate 31.

In addition, the pulley 11 is formed into a U-like shape to open to the motor 12 side as viewed in a longitudinal cross section taken along any side thereof. An exciting coil 25 is disposed in the interior of the pulley 11 extending along a circumferential direction of the pulley 11. An armature (a clutch plate) 35 is attached to a rear side of the rotor disc 34. This armature 35 is biased by means of a leaf spring 36 to abut with the rear side of the rotor disc 34, in which state the armature 35 and the front wall portion 33 of the pulley 11 are spaced apart from each other. Then, when the exciting coil 25 within the pulley 11 is energized, a magnetic force generated in the exciting coil 25 attracts the armature 35, whereby the armature 35 comes to adhere to the front wall portion 33 of the pulley 11, in which state the armature 35 engages with the front wall portion 33 of the pulley 11. Consequently, the electromagnetic lock-up clutch 21 including the exciting coil 25, the armature 35 and the front wall portion 33 of the pulley 11 itself is disposed in the inner circumferential portion of the pulley 11, whereby the pulley 11 and the lock-up clutch 21 are arranged in a nesting.

The armature 35 connects to the sun gear 17 of the planetary gear mechanism portion 13 via the rotor shaft 16. The pulley 11 connects to the pinion carrier 15 via the pulley shaft 14. Consequently, since the sun gear 17 and the pinion carrier 15 are connected together by bringing the lock-up clutch 21 into an engaged state (ON) so that the planetary gear mechanism portion 13 is integrated. Accordingly, the auxiliary unit drive shaft 19 connected to the ring gear 18 can be directly connected to the rotor shaft 16 and the pulley shaft 14 so that all the shafts can be driven together. A state in which the armature 35 is spaced apart from the front wall portion 33 of the pulley 11 is referred to as a released or disengaged state of the lock-up clutch 21 (OFF).

Figure 4:
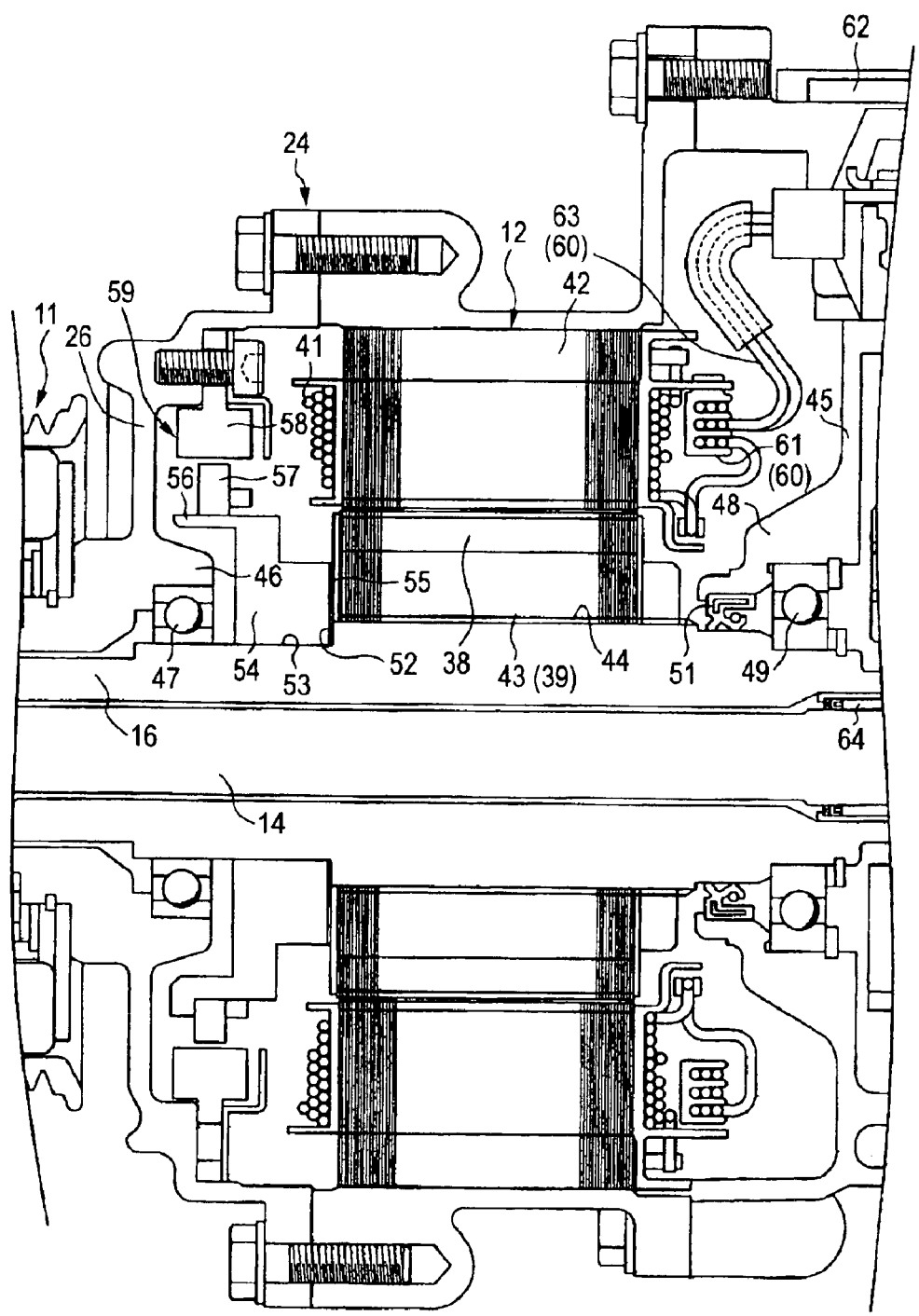
FIG. 4 is showing a detailed cross-sectional view of a motor.

As shown in FIG. 4, a rotor 39 of the motor 12 is provided with a plurality of magnets 38 around an outer circumferential portion thereof. A stator 42 is provided with a plurality of motor coils 41 which are disposed so as to face the respective magnets 38 in a radial direction and are connected in three phases. The stator 42 is fixed to an inner wall of the main body casing 24 such that the rotor 39 is allowed to rotate clockwise and counterclockwise by supplying exciting currents in U-phase, V-phase and W-phase to the respective motor coils 41. The rotor shaft 16 and the pulley shaft 14 pass through a rotor yoke 43 of the rotor 39 along the axis C. Splines are formed in the outer circumferential portion of the rotor shaft 16 at a location thereof which radially overlaps the rotor yoke 43. When the rotor yoke 43 is press fitted on this splines formed portion 44, the rotor shaft 16 and the rotor 39 are connected together.

A partition wall 45 is provided on the main body casing 24 between the motor 12 and the planetary gear mechanism portion 13. The motor 12 is disposed in such a manner as to provide predetermined spaces between front and rear ends thereof and the front wall 26 and the partition wall 45, respectively. A projecting portion 46 is formed on the front wall 26 of the main body casing 24 by causing a portion of the front wall 26 in the vicinity of the rotor shaft 16 to project toward the motor 12 side. Ball bearings 47 are mounted in an inner circumferential portion of the projecting portion 46. In addition, as with the front wall 26, a projecting portion 48 is also formed on the partition wall 45 of the main body casing 24 by causing a portion of the partition wall 45 in the vicinity of the rotor shaft 16 to project toward the motor 12 side. Ball bearings 49 are mounted in an inner circumferential portion of the projecting portion 48. Then, the rotor shaft 16 is rotatably supported in the main body casing 24 by means of the respective ball bearings 47, 49. Here, an oil seal 51 is mounted in front of the ball bearings 49 in the inner circumferential portion of the projecting portion 48 of the partition wall 45 for establishing a sealing between an inner circumferential surface of the projecting portion 48 and an outer circumferential surface of the rotor shaft 16.

A diametrically reduced portion 53 is formed in front of the splines formed portion 44 of the rotor shaft 16 via a surface 52 including a difference in diameter or a step which intersects with the axis C at substantially right angles. A annular sensor guide 54 is press fitted on the diametrically reduced portion 53. A part of a rear side of the sensor guide 54 is brought into abutment with the stepped surface 52, whereby the sensor guide 54 is positioned in place. An arm portion 56 is formed on the sensor guide 54 in such a manner as to extend forward while avoiding the interference with the projecting portion 46. A resolver rotor 57 including magnets and electromagnetic steel plates is mounted on an outer circumferential portion of the arm portion 56. A resolver stator 58 is mounted in an inner circumferential portion of the main body casing 24 in such a manner as to face the resolver rotor 57 in the radial direction. The sensor guide 54, resolver rotor 57 and resolver stator 58 constitute a resolver (a rotating sensor) 59. When the resolver rotor 57 rotates together with the rotor 39, a change in inductance generated in a coil (not shown) on the resolver stator 58 is detected to thereby measure the angular velocity of the rotor 39. The resolver 59, the projecting portion 46 and the ball bearings 47 are disposed to be aligned in the radial direction and hence are arranged in a nest construction.

An annular bus ring 61 is provided behind the stator 42 for establishing connections to the motor coils 41 in the respective phases. Furthermore, distributing cables 63 for supplying exciting currents in the respective phases are laid out to extend between an upper portion of the bus ring 61 and a terminal box 62 provided at an upper portion of the main body casing 24. Distributing components 60 such as the bus ring 61 and the distributing cables 63 are disposed to be aligned with the projecting portion 48, the ball bearings 49 and the oil seal 51 in the radial direction, whereby all these components are arranged in a nest construction. Here, reference numeral 64 denotes needle bearings which are provided to form pairs with the needle bearings 32. These needle bearings 32, 64 have a sealing function. A grease can be encapsulated within a space formed between the rotor shaft 16 and the pulley shaft 14 and more particularly between the respective needle bearings 32, 64.

Figure 5:
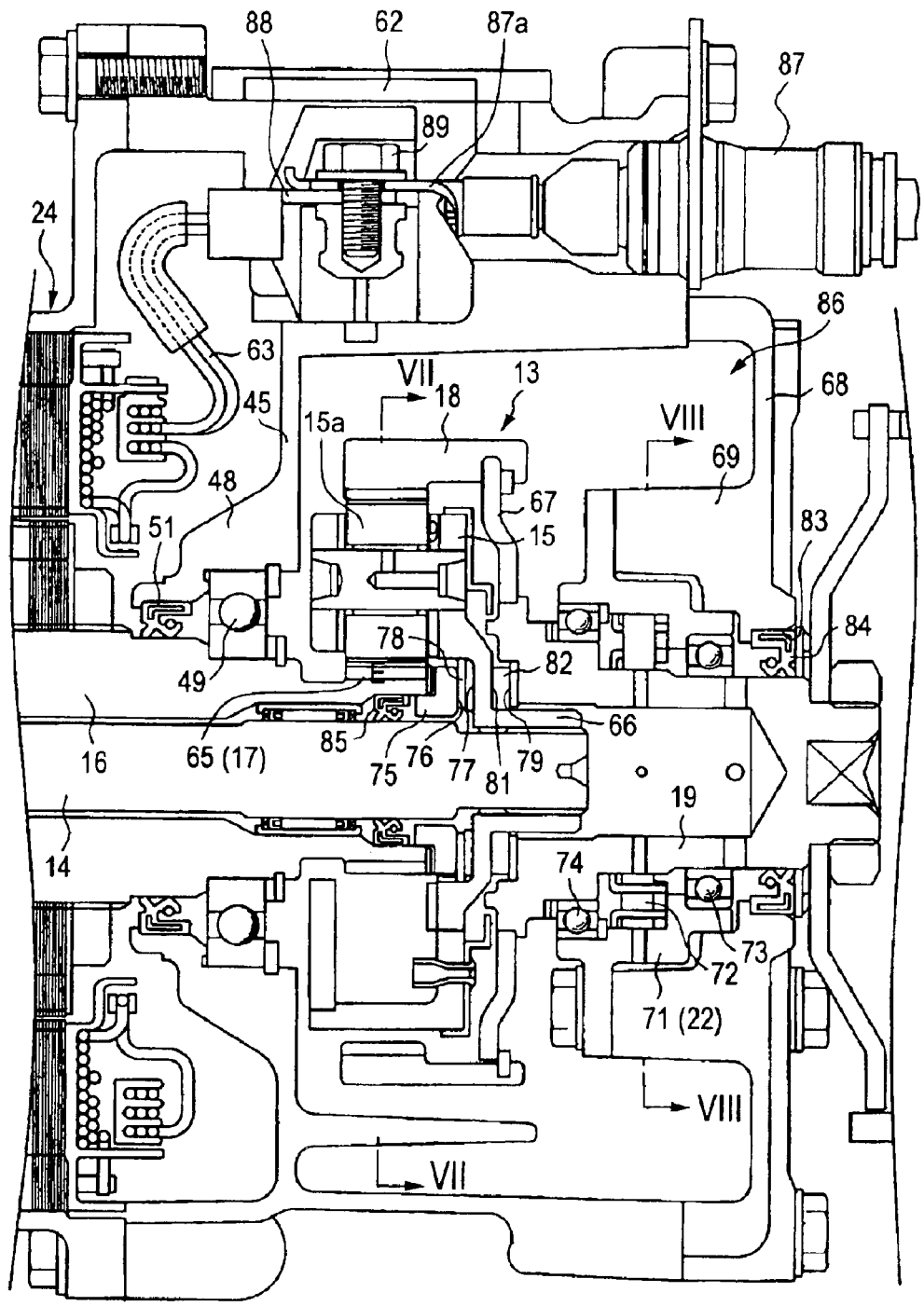
FIG. 5 is showing a detailed cross-sectional view of a planetary gear mechanism portion and a one-way clutch.
Figure 7:
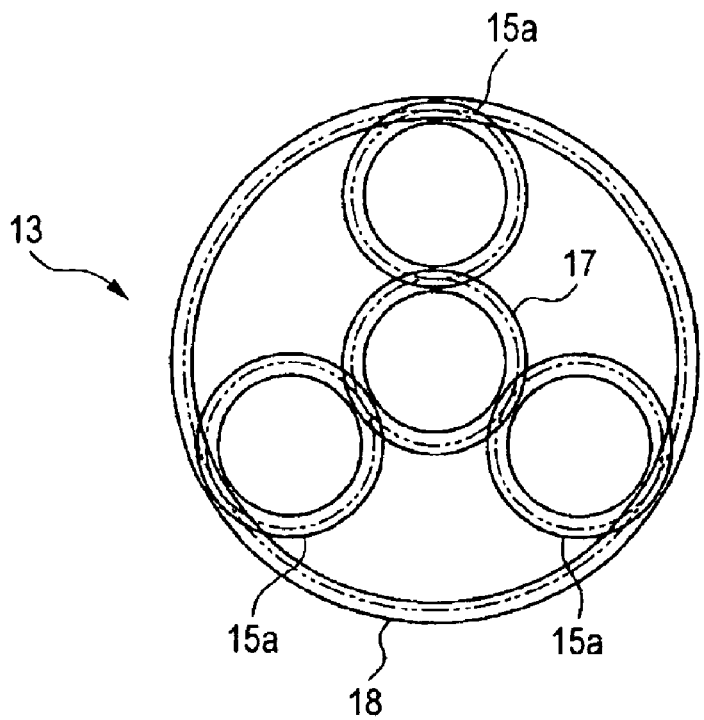
FIG. 7 is showing A cross-sectional view taken along the line B—B in FIG. 5.

As shown in FIG. 5, the planetary gear mechanism portion 13, the auxiliary unit drive shaft 19 and the one-way clutch 22 are disposed behind the partition wall 45 in the main body casing 24. A gear is formed in an outer circumferential surface of a rear end portion of the rotor shaft 16, and this gear formed portion 65 includes the sun gear 17 of the planetary gear mechanism portion 13. In addition, a rear end portion of the pulley shaft 14 extends as far as a position rearward of the sun gear 17, and a portion 66 where the pinion carrier 15 is fitted on is spline coupled to the rear end portion, whereby the pulley shaft 14 and the pinion carrier 15 are connected together. Then, the ring gear 18 is connected to a front end portion of the auxiliary unit drive shaft 19 via a plate 67. Here, as shown in FIG. 7, the planetary gear mechanism portion 13 is formed into a single pinion planetary gear set having a single row of pinion gears 15a. The sun gear 17, the pinion gears 15a and the ring gear 18 are constructed such that a radius ratio of about 1 to about 1 to about 3 is established among the respective gear elements when taking the sun gear 17 as about 1.

Figure 8:
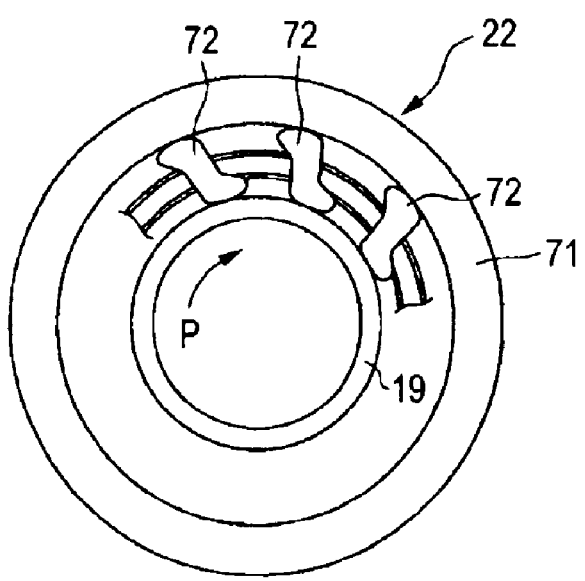
FIG. 8 is showing a cross-sectional view taken along the line D—D in FIG. 5.

A projecting portion 69 is formed on a rear wall 68 of the main body casing 24 by causing a portion of the rear wall 68 in the periphery of the auxiliary unit drive shaft 19 to project toward the planetary gear mechanism portion 13 side. An annular clutch guide 71 is fixed to this projecting portion 69. As shown in FIG. 8, a plurality of cam parts 72 are arranged in an inner circumferential direction in an inner circumferential portion of the clutch guide 71. The mechanical one-way clutch 22 is made up of the clutch guide 71, the cam parts 72, and the auxiliary unit drive shaft 19. When a torque is exerted on the auxiliary unit drive shaft 19 in the direction indicated by the arrow P (in the clockwise direction of the pulley) by the one-way clutch 22, the auxiliary unit drive shaft 19 is permitted to rotate, whereas a torque is exerted on the auxiliary unit drive shaft 19 in an opposite direction to the direction indicated by the arrow P. The auxiliary unit drive shaft 19 is brought into engagement with the clutch guide 71 by virtue of a wedge effect of the cam parts 72, whereby the auxiliary unit drive shaft 19 is restricted from rotating in that direction. Ball bearings 73, 74 are mounted in front of and behind the cam parts 72 in an inner circumferential portion of the clutch guide 71. The auxiliary unit drive shaft 19 is rotatably supported in the main body casing 24 by means of these ball bearings 73, 74.

A ring-like end part 75 is mounted on the rotor shaft 16 at a rear end thereof. A rear end surface 76 of the rotor shaft 16 is constituted by this end part 75. In addition, a contact surface 77, which confronts the rear end surface 76 in the direction of the axis C, is formed on the pinion carrier 15. Thrust bearings 78 are interposed between the rear end surface 76 and the contact surface 77 so as to bear a thrust load generated between the pinion carrier 15 and the rotor shaft 16. Similarly, thrust bearings 82 are interposed between a front end surface 79 formed on the auxiliary unit drive shaft 19 and a rear contact surface 81 formed on the pinion carrier 15 in such a manner as to confront the front end surface 79 in the direction of the axis C so as to bear a thrust load generated between the pinion carrier 15 and the auxiliary unit drive shaft 19.

In addition, an oil seal 84 is mounted in an inner circumferential portion of an opening 83 formed in the rear wall 68 of the main body casing 24 in such a manner as to seal between an inner circumferential surface of the opening 83 and the outer circumferential surface of the auxiliary unit drive shaft 19. Additionally, an oil seal 85 is mounted in the rotor shaft 16 at the rear end portion thereof for establishing a sealing between an inner circumferential surface of the rear end portion and the outer circumferential surface of the pulley shaft 14. Then, as has been described above, the oil seal 51 is mounted in the projecting portion 48 of the partition wall 45, whereby a space formed behind the partition wall 45 in the main body casing 24 is constructed as an oil chamber 86 by the respective oil seals 51, 84, 85. By filling this oil chamber 86 with a lubricating oil, the planetary gear mechanism portion 13 and the one-way clutch 22 can equally be lubricated using the oil chamber 86 and the lubricating oil so filled therein which are shared therebetween. In addition, the ball bearings 49 which carries the rotor shaft 16 and the ball bearings 73, 74 which carry the auxiliary unit drive shaft 19 are disposed within the oil chamber 86, whereby those ball bearings 73, 74 can be lubricated with the lubricating oil which is shared by the same ball bearings.

The terminal box 62 for connecting the motor 12 with an electric equipment system of the vehicle is provided on the outer circumferential portion of the main body casing 24 above the planetary gear mechanism portion 13. A front lower portion of the terminal box 62 is constructed so as to communicate with a space in front of the partition wall 45, and the distributing cables 63 of the motor 12 are arranged to extend from this connecting portion to the interior of the terminal box 62. In addition, connecting end portions 87 of feeding cables which correspond to the U-phase, V-phase and W-phase are mounted from a rear end of the terminal box 62. Then, terminal portions 88 in the respective phases which are provided at one ends of the corresponding distributing cables 63 are connected to terminal portions 87a provided at distal ends of the connecting end portions 87 of the feeding cables, respectively, by means of respective bolts 89.

Figure 6:
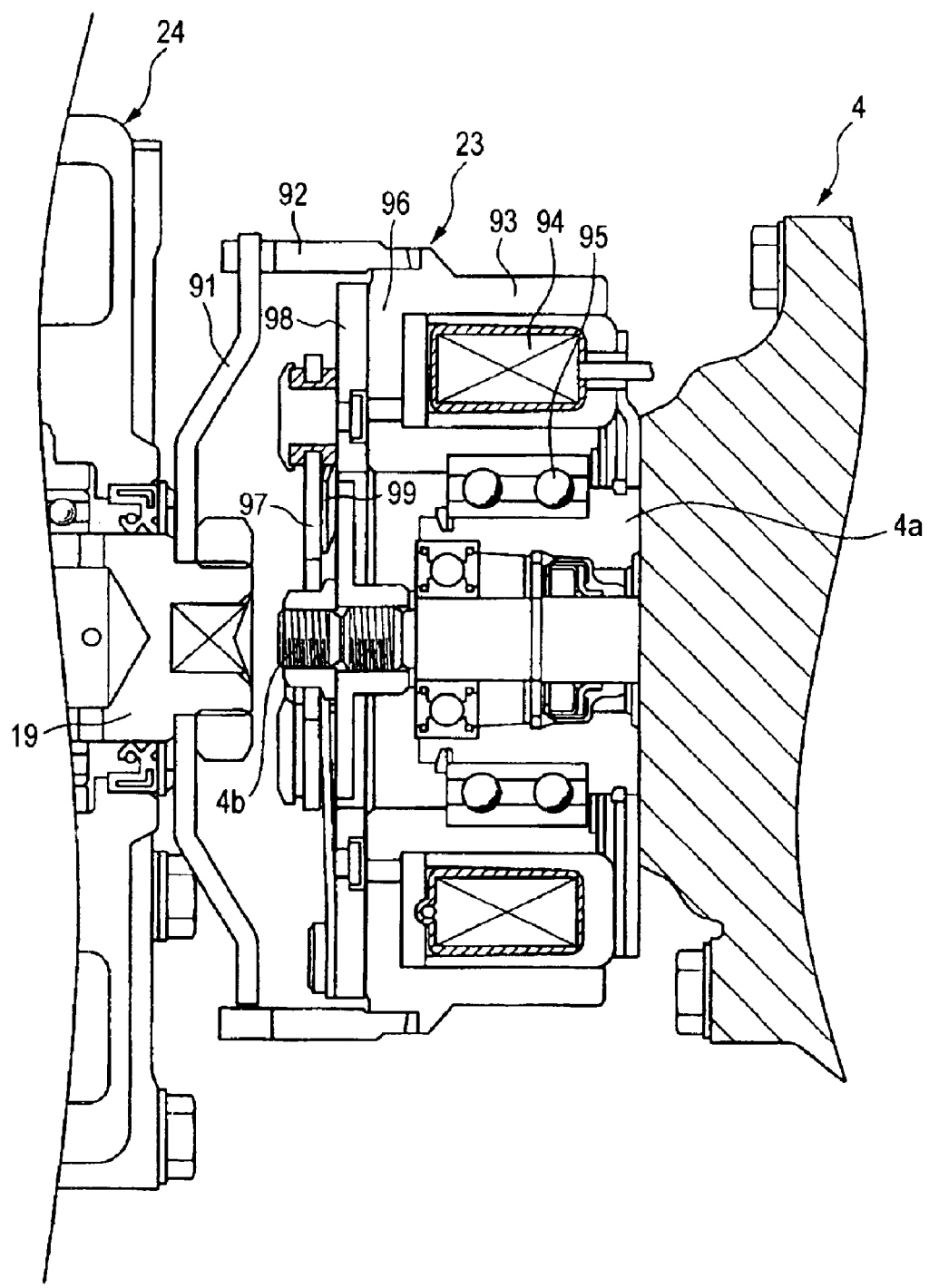
FIG. 6 is showing a detailed cross-sectional view of an auxiliary unit clutch.

As shown in FIG. 6, a rotor plate 91 of the auxiliary unit clutch 23 is mounted on the auxiliary unit drive shaft 19 at the rear end portion thereof. The rotor plate 91 is connected to a rotor portion 93 via an extension 92. A round tubular portion 4a is formed at a front part of the compressor 4 in such a manner as to protrude therefrom. The rotor portion 93 and the round tubular portion 4a are made to rotate freely relative to each other by means of a plurality of ball bearings 95 provided around an outer circumferential portion of the round tubular portion 4a.

In addition, the rotor portion 93 is formed into a U-like shape which is made to open to the compressor 4 side as viewed in a longitudinal cross section taken along any side thereof. An exciting coil 94 is disposed in the interior of the rotor portion 93. A flattened armature disc 97 is disposed between the rotor plate 91 and a front wall portion 96 of the rotor portion 93 and is then connected to a distal end portion of an auxiliary unit shaft 4b which protrudes forward from the round tubular portion 4a. An armature 98 is attached to a rear side of the armature disc 97 and is biased by means of a leaf spring 99 so as to be in abutment with the rear side of the armature 98 (a released state).

Then, when the exciting coil 94 is energized so that the armature 98 is attracted so as to adhere to the front wall portion 96 of the rotor portion 93, the auxiliary unit clutch 23 is brought into an engage state (ON), whereas when the compressor 4 does not need to be driven, the auxiliary unit clutch 23 is brought into the released state (OFF) so as to reduce the torque loss. It is possible to reduce the consumption of power and fuel. Here, since power sources such as the pulley 11 and the motor 12 are disposed in front of the planetary gear mechanism portion 13 and the compressor 4, which is the auxiliary unit, is disposed behind or an opposite side of the planetary gear mechanism portion 13 to the side where the power sources are disposed, the auxiliary unit shaft 4b does not have to be formed into a hollow shaft. Therefore, scroll compressor can be adopted.

Next, functions of the driving system 10 when the engine is started up, power is generated and the auxiliary unit is driven will be described below, respectively.

Figure 9:
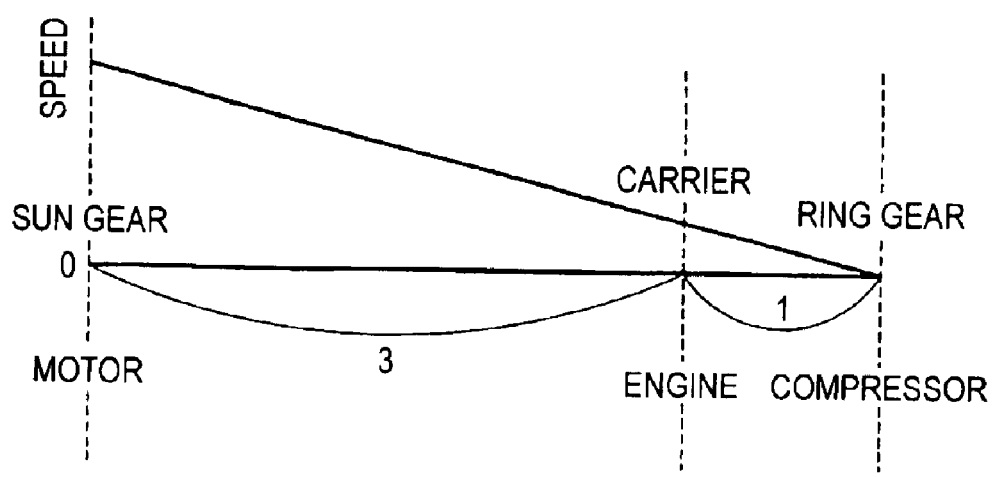
FIG. 9 is showing a speed diagram of respective elements of the planetary gear mechanism portion when the engine is started up.

As shown in a speed diagram in FIG. 9, when the engine is started up by the motor 12, the lock-up clutch 21 is disengaged, and the differential motion is allowed to take place in the planetary gear mechanism portion 13. Then, power is supplied to the motor 12 so as to generate a torque in the clockwise direction (the direction indicated by the arrow P), and the sun gear 17 is driven together with the rotor shaft 16. Since the friction of the engine 1 is exerted on the pinion carrier 15 which is linked to the engine 1 via the pulley shaft 14, although the ring gear 18 attempts to rotate in a reverse direction (an opposite direction to the direction indicated by the arrow P) via the pinion gears 15a, since the auxiliary unit drive shaft 19 which is connected to the ring gear 18 is restricted by the one-way clutch 22, the auxiliary unit drive shaft 19 cannot rotate in the reverse direction. Consequently, with the ring gear 18 being fixed, the planetary gear mechanism portion 13 operates as a reduction gear with a rotational ratio between the sun gear 17 and the pinion carrier 15 of 4 to 1, and thus the pulley shaft 14 can be driven to crank the engine 1 by a torque which is about four times larger than that of the motor 12. Moreover, since the speed is reduced by the planetary gear mechanism portion 13, the motor 12 can be driven in a high-speed area which provides good efficiency.

Figure 10:
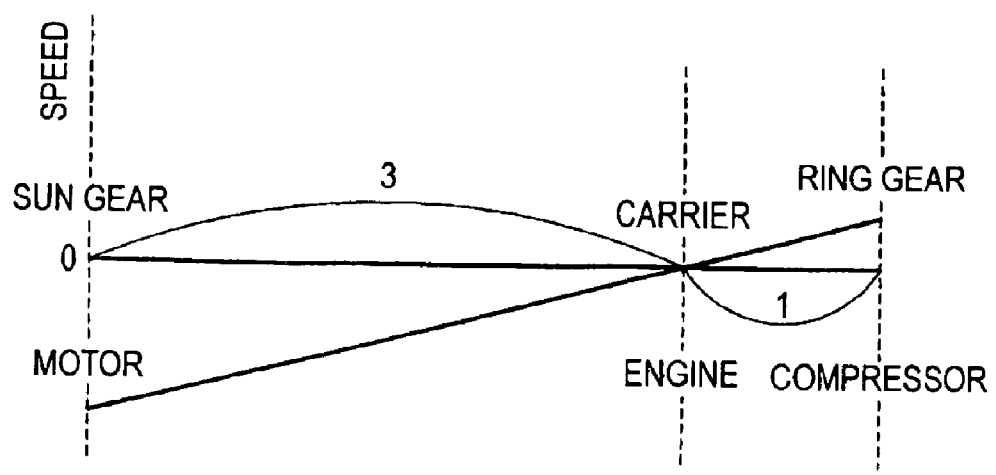
FIG. 10 is showing a speed diagram of the respective elements of the planetary gear mechanism portion when a compressor is driven by the motor.

In addition, as shown in a speed diagram in FIG. 10, when the auxiliary unit is driven by the motor 12 while the engine is being stopped, the lock-up clutch 21 is released, and the planetary gear mechanism portion 13 are allowed to produce a differential motion. Then, the motor 12 is caused to generate a torque in the reverse direction, so that the sun gear 17 is driven together with the rotor shaft 16. Since the friction of the engine 1 in the reverse direction is exerted on the pinion carrier 15 which is linked to the engine 1 via the pulley shaft 14, the pinion carrier 15 does not rotate, whereas the ring gear 18 rotates in the clockwise direction via the pinion gears 15a. Consequently, with the pinion carrier 15 being fixed, the planetary gear mechanism portion 13 operates as the reduction gear with a rotational ratio between the sun gear 17 and the ring gear 18 of 3 to 1, and thus the auxiliary unit drive shaft 19 can be driven to operate the compressor 4 by a torque which is about three times larger than that of the motor 12. Moreover, since the speed is reduced by the planetary gear mechanism portion 13. The motor 12 is allowed to be driven in the high-speed area which provides good efficiency.

Figure 11:
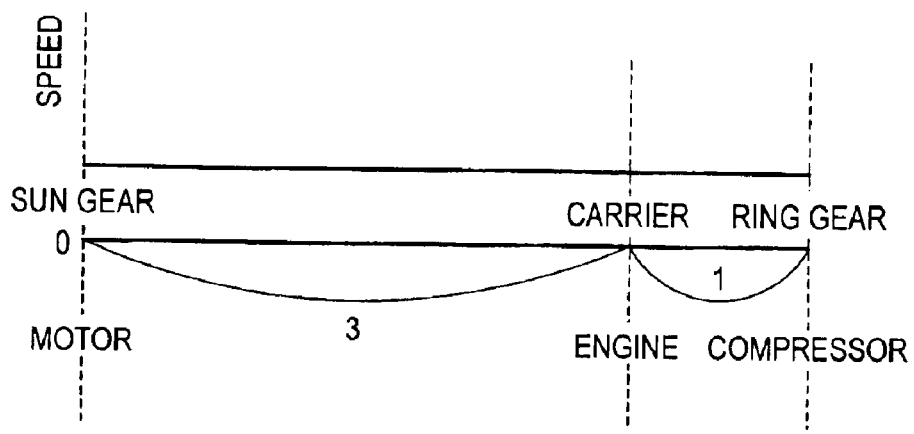
FIG. 11 is showing a speed diagram of the respective elements of the planetary gear mechanism portion when the compressor is driven by the engine.

Additionally, as shown in a speed diagram in FIG. 11, when the auxiliary unit is driven by the engine, the lock-up clutch 21 is engaged so that the pulley shaft 14 and the rotor shaft 16 are direct connected to each other. Namely, the planetary gear mechanism portion 13 is made to operate as an integrated unit, and the pulley 11 can be driven while it is being direct connected to the compressor 4. As this occurs, the motor 12 is driven while it is being direct connected to the pulley 11, and by controlling the motor 12 as a generator, the battery can be charged. On the contrary, by controlling the motor 12 as an electric motor, the compressor 4 can be driven using both the engine 1 and the motor 12 or the motor 12 can assist the engine 1 in driving.

Figure 12:
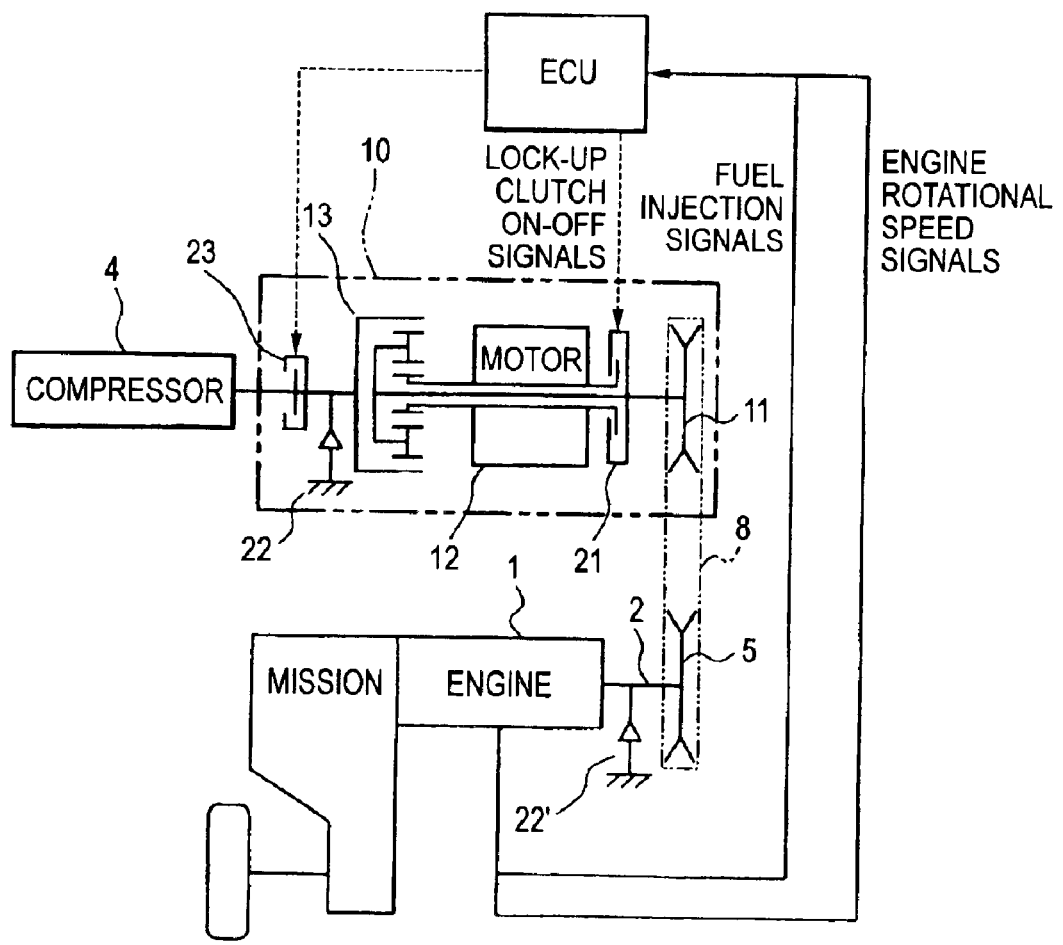
FIG. 12 is showing a typical view of an engine system which incorporates therein a driving system of the invention.

Next, referring to FIGS. 12 to 14, an engine system incorporating therein the driving system 10 will be described. The engine system, as used herein, includes the engine 1, the driving system 10, the compressor 4 and an ECU which controls the operation of the first three constituent components, as shown in FIG. 12. Note that like reference numerals are imparted to like components to those described above and the description thereof will be omitted here.

The ECU is electrically connected to the lock-up clutch 21 and the auxiliary unit clutch 23 so as to switch the states of these clutches between a released or disengaged state and an engaged state. In addition, fuel injection signals and engine rotational speed signals are inputted from the engine 1 into the ECU, so that whether or not the engine itself is producing a torque is determined. For example, a signal is generated to bring the lock-up clutch 21 into an engaged (ON) or disengaged (OFF) state. Here, in this engine system, a mechanical one-way clutch 22', which is similar to the one-way clutch 22, is provided at an end portion of the crankshaft 2 of the engine 1 so as to restrict the reverse rotation of the crankshaft 2, whereby when the auxiliary unit is driven by the motor 12, the compressor 4 can be driven free from any restriction resulting from the engine 1 friction.

Figure 13:
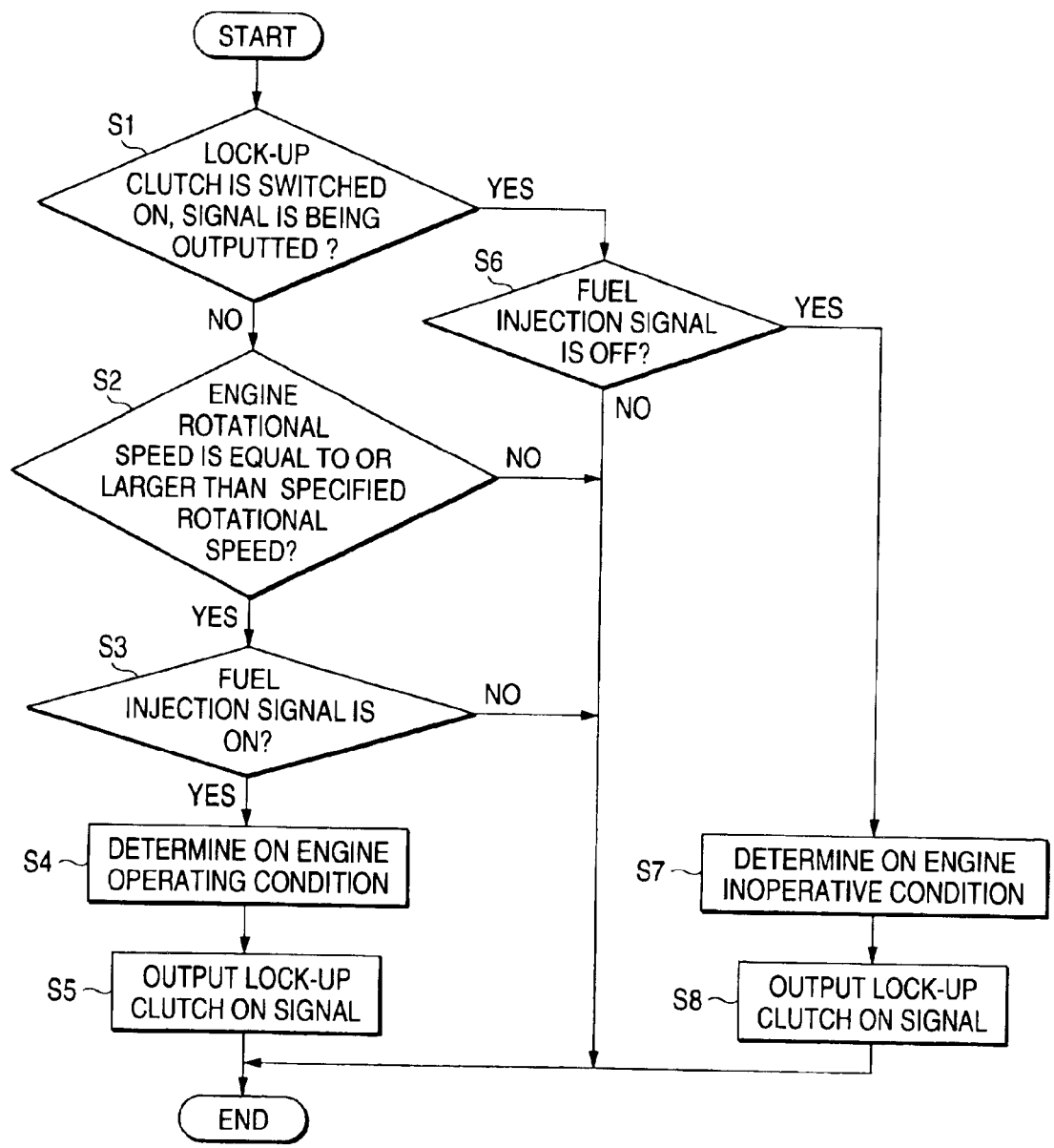
FIG. 13 is showing a flowchart showing a control flow of the lock-up clutch.

A control flowchart shown in FIG. 13 shows a control procedure of the lock-up clutch 21. Firstly, in step S1, whether or not a lock-up clutch ON signal is being outputted is determined. In case of NO (in case the lock-up clutch 21 is disengaged or released), in step S2, whether or not the engine rotational speed is equal to or larger than a specified rotational speed is determined. In case of NO, then, stop the series of processes, whereas in case of YES, in step S3, whether or not a fuel injection signal is ON is determined. In case of No, then, stop the series of processes, whereas in case of YES, in step S4, the operating condition of the engine is determined, and thereafter, in step S5, output a lock-up clutch ON signal, and then stop the series of processes.

In addition, in step S1, in case the lock-up clutch ON signal is outputted (in case the lock up clutch 21 is engaged), in step S6, whether or not the fuel injection signal is OFF is determined. In case of NO, then, stop the series of processes, whereas in case of YES, in step S7, determine on the operating condition of the engine, and thereafter, in step S8, output a lock-up clutch OFF signal, and stop the series of processes.

As shown in FIG. 14, in a vehicle equipped with the engine system, when the engine is stopped with the air conditioner being switched off, the lock-up clutch 21 is switched off (disengaged), and the motor 12 remains inoperative. As this occurs, the conditions of the one-way clutches 22, 22' and the auxiliary unit clutch 23 are of no importance.

In addition, when the engine is stopped with the air conditioner being switched on, the lock-up clutch 21 is switched off, the one-way clutch 22 is made free, the one-way clutch 22' is locked up, and the auxiliary unit clutch 23 is switched on (engaged). Then, the motor 12 rotates in the counterclockwise or reverse direction and performs motor drive to drive the compressor 4.

Additionally, when the engine is started up, the lock-up clutch 21 is switched off, the one-way clutch 22 is locked up, and the one-way clutch 22' is made free. Then, the motor 12 rotates in the forward or clockwise direction and performs motor drive to crank the engine. As this occurs, the condition of the auxiliary unit clutch 23 is of no importance.

Furthermore, when the engine is in operation with the air conditioner being switched on, the lock-up clutch 21 and the auxiliary unit clutch 23 are switched on, and the one-way clutches 22, 22' are made free. Then, the motor 12 rotates in the clockwise direction and performs motor drive or generates power.

Then, when the engine is in operation with the air conditioner being switched off, the lock-up clutch 21 is switched on, the auxiliary unit clutch 23 is switched off, and the one-way clutches 22, 22' are made free. Then, the motor 12 rotates in the clockwise direction and performs motor drive or generates power.

According to the embodiment that has been described heretofore, only by incorporating the driving system 10 into the engine system of the vehicle and controlling the operation of the lock-up clutch 21 and the auxiliary unit clutch 23 and the driving of the motor 12, it is possible to implement various operation modes such as starting up the engine 1, driving the compressor 4 while the engine 1 is being stopped, and driving the compressor 4 by the engine 1. Thus, according to the embodiment, since the auxiliary unit such as the compressor 4 can be driven by the motor 12 when the engine 1 is stopped while the hybrid or automatic idling stop vehicle is in operation, the comfortableness in the vehicle can be maintained. As this occurs, although the one-way clutch 22' provided on the crankshaft 2 is locked up, since the one-way clutch 22' is mechanical, there is no need to control the one-way clutch 22' using the ECU. Similarly, although the one-way clutch 22 is locked up when the engine is started up, there is no need to control the same.

In addition, while the vehicle is run by the engine 1, by operating the motor 12 as an electric motor, the engine 1 and the motor 12 can both be used to drive the compressor 4. The motor 12 can also be used to assist the engine 1 in driving to thereby enhance the fuel economy. Furthermore, when the air conditioner is switched off, the auxiliary unit clutch 23 is switched off so as to decrease the friction to thereby enhance the fuel economy further.

Furthermore, since the driving system 10 can attain the respective operation modes with the single motor 12, the number of components involved can be suppressed so as to reduce the production costs. Since the torque generated by the motor 12 is amplified by the planetary gear mechanism portion 13 and is then transmitted to the engine 1 and the compressor 4, the motor 12 can be made small in size and light in weight.

Then, since the pulley 11, the lock-up clutch 21, the motor 12, the planetary gear mechanism portion 13, the one-way clutch 22 and the auxiliary unit clutch 23 are disposed in line on the same axis C and are coupled together in that state, there is no need to provide a power transmission component such as a gear and a belt, and therefore, the number of components involved can be suppressed, and power can be transmitted with good efficiency. Furthermore, even in the event that the driving system 10 is attempted to be side mounted on the engine, the driving system 10 is easy to be mounted on the engine while avoiding the interference with the intake and exhaust manifolds.

In addition, since the pulley 11 and the lock-up clutch 21 are arranged in the nest construction, the resolver 59, the projecting portion 46 and the ball bearings 47 are arranged in the nest construction, and the ball bearings 49 and the oil seal 51 are arranged in the nest construction, the length of the driving system 10 along the direction of the axis C can be reduced. Due to this, the mounting properties of the driving system 10 can be enhanced further, and the in-line connection of the compressor 4 can be facilitated, thereby making it possible to enhance the degree of freedom in the lay-out of the components.

Figure 15:
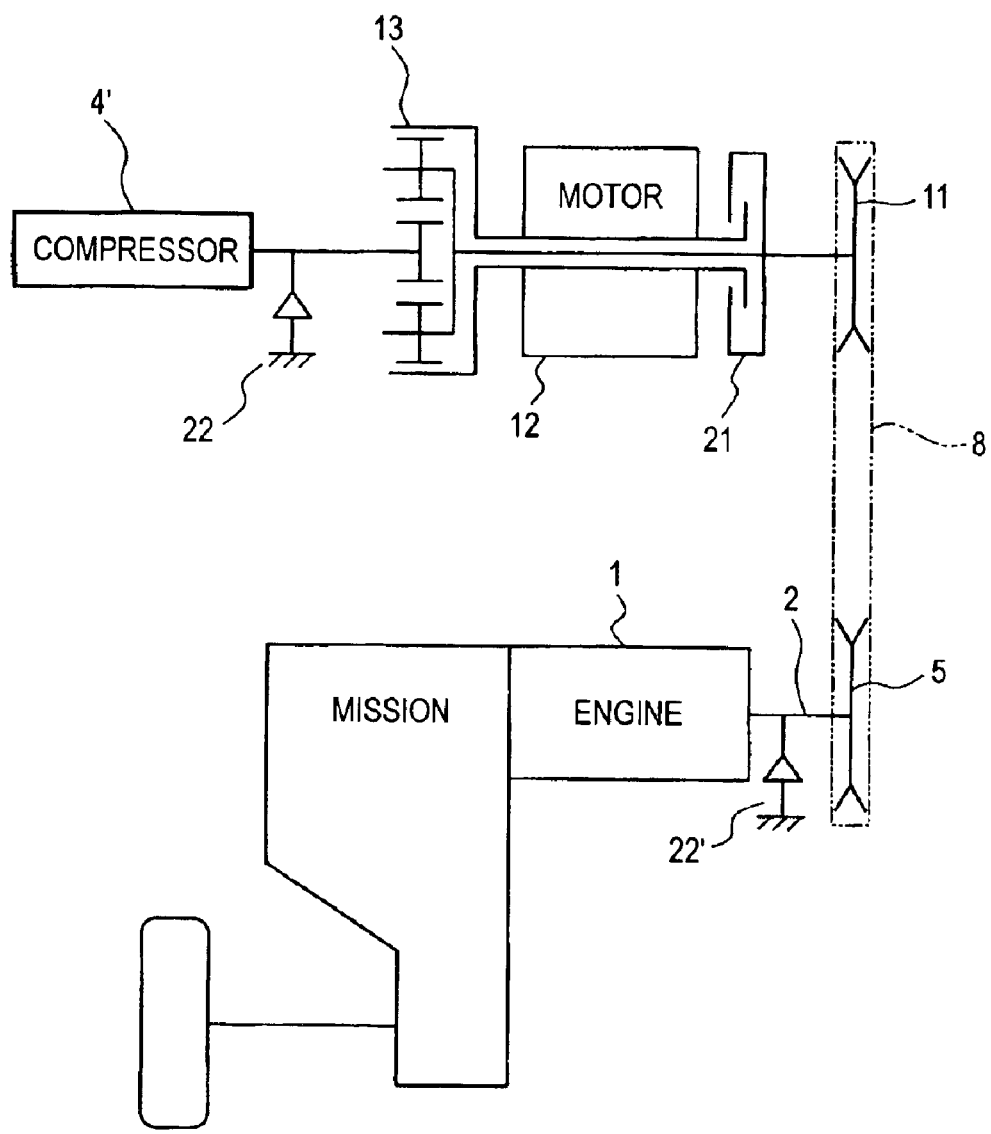
FIG. 15 is showing a typical view showing modified driving system and engine system.

Note that the invention is not limited to the embodiment that has been described above but may be modified variously; for example, as shown in FIG. 15, the compressor 4 and the motor 12 may be connected to the other elements of the planetary gear mechanism portion 13, respectively, such as the compressor 4 being connected to the sun gear 17 and the motor 12 being connected to the ring gear 18.

In addition, while the driving system is connected to the crankshaft 2 via the crank pulley 5, the belt 8 and the pulley 11, depending upon the installation space, it goes without saying that the driving system 10 may be direct connected to the crankshaft 2. Similarly, the compressor 4, which is connected to the driving system 10 in line in the embodiment, may be connected to the driving system 10 in parallel via a pulley and a belt.

Furthermore, other auxiliary units than the air conditioner compressor 4 such as a transmission hydraulic pump and a water pump may be connected to the driving system 10 so as to be driven by the motor 12, as with the compressor 4, when the engine is being stopped.

Here, in case a variable-capacity compressor 4' is used for the compressor 4, since the work volume of the variable-capacity compressor 4' can be varied, the friction can be reduced so as to improve the fuel economy without providing the auxiliary unit clutch 23. In addition, in the event that the normal compressor 4 is driven by the motor 12, while the compressor 4 is allowed to be driven without being restricted by the friction of the engine 1 through locking up of the one-way clutch 22, in the case of the variable-capacity compressor 4', since its load torque can be varied, the variable-capacity compressor 4' can be driven by adjusting the load torque thereof. Consequently, the one-way clutch 22' can be made unnecessary.

[Advantages of the Invention]

Thus, as has been described heretofore, according to the first and second aspects of the invention, since only by controlling the connecting means and the motor it becomes possible to implement the various operation modes such as starting up engine and driving the compressor by the motor, as well as driving the auxiliary unit by the engine, the comfortableness in the vehicle can be maintained even while the engine is being stopped during the operation of the hybrid and automatic idling stop vehicles.

In addition, since the planetary gear mechanism, the motor, the connecting means and the auxiliary unit drive shaft can be coupled together on the same axis and the auxiliary unit can be connected to them on the same axis, power transmitting gear and belt are no more required, thereby making it possible to reduce the parts costs and the weight of the system. In particular, in case the driving system is disposed substantially in parallel with the crankshaft, it is easy to avoid the interference of the driving system with the intake and exhaust manifolds, and hence the mounting properties of the driving system can be improved. Moreover, the degree of freedom in the lay-out of the same system can also be increased.

According to the third aspect of the invention, since the motor torque can be amplified through the constituent elements of the planetary gear mechanism, the motor can be made smaller in size and lighter in weight. In addition, in case the auxiliary unit is direct connected to the drive shaft, since the shaft of the auxiliary unit does not have to be formed into a hollow shaft, a scroll compressor can be connected to the driving system as an auxiliary unit so as to be driven by the same system.

According to the fourth aspect of the invention, since the nest construction can be adopted in which the connecting means is disposed in the interior of the pulley, the driving system can be made shorter in length along the axial direction, whereby the mounting properties of the driving system can further be enhanced.

According to the fifth aspect of the invention, since the planetary gear mechanism and the rotational direction restricting means can be lubricated by sharing the single oil chamber, the lay-out of the lubricating oil path can be made simple.

According to the sixth aspect of the invention, since the driving system and the auxiliary unit can be laid out according to the available installation space of the vehicle, the degree of freedom in installing the driving system in the vehicle can be enhanced.

What is claimed is:

1. A vehicle driving system comprising:
    a synchronizing shaft synchronously rotating with a crankshaft of an engine;
    a drive shaft driving an auxiliary unit;
    a planetary gear mechanism including a sun gear, a pinion carrier and a ring gear, said synchronizing shaft and said drive shaft connecting to any two of said sun gear, pinion carrier and ring gear respectively;
    a motor connecting to a remaining element of said planetary gear mechanism;
    a connecting device for connecting together two or more elements of said planetary gear mechanism; and
    a rotation restricting mechanism for restricting the rotation of the drive shaft in one direction,
    wherein said planetary gear mechanism, said motor, said connecting device and said drive shaft are coaxially disposed in line.

2. The vehicle driving system according to claim 1, wherein said connecting device, said motor, said planetary gear mechanism and said drive shaft are disposed in that order.

3. The vehicle driving system according to claim 1, wherein said planetary gear mechanism is a single pinion planetary gear mechanism in which said synchronizing shaft, said pinion carrier and said drive shaft are connected to the pinion carrier, the sun gear and the ring gear, respectively,
    wherein said connecting device and said planetary gear mechanism are disposed adjacent to said motor, respectively, such that said motor is held between said connecting device and said planetary gear mechanism,
    wherein said connecting device is disposed on one side of said motor, and said planetary gear mechanism is disposed on the other side of said motor with the drive shaft being disposed adjacent to said planetary gear mechanism at a location thereof which is opposite to a location where the motor is disposed.

4. The vehicle driving system according to any of claims 1 to 3, wherein a pulley is provided on said synchronizing shaft, and said connecting device is disposed in the interior of the pulley.

5. The vehicle driving system according to any of claims 1 to 3, wherein the rotation restricting mechanism is disposed adjacent to the planetary gear mechanism.

6. The vehicle driving system according to any of claims 1 to 3, wherein said drive shaft and said auxiliary unit are disposed on different axes.

* * * * *